United States Patent Office 3,803,297
Patented Apr. 9, 1974

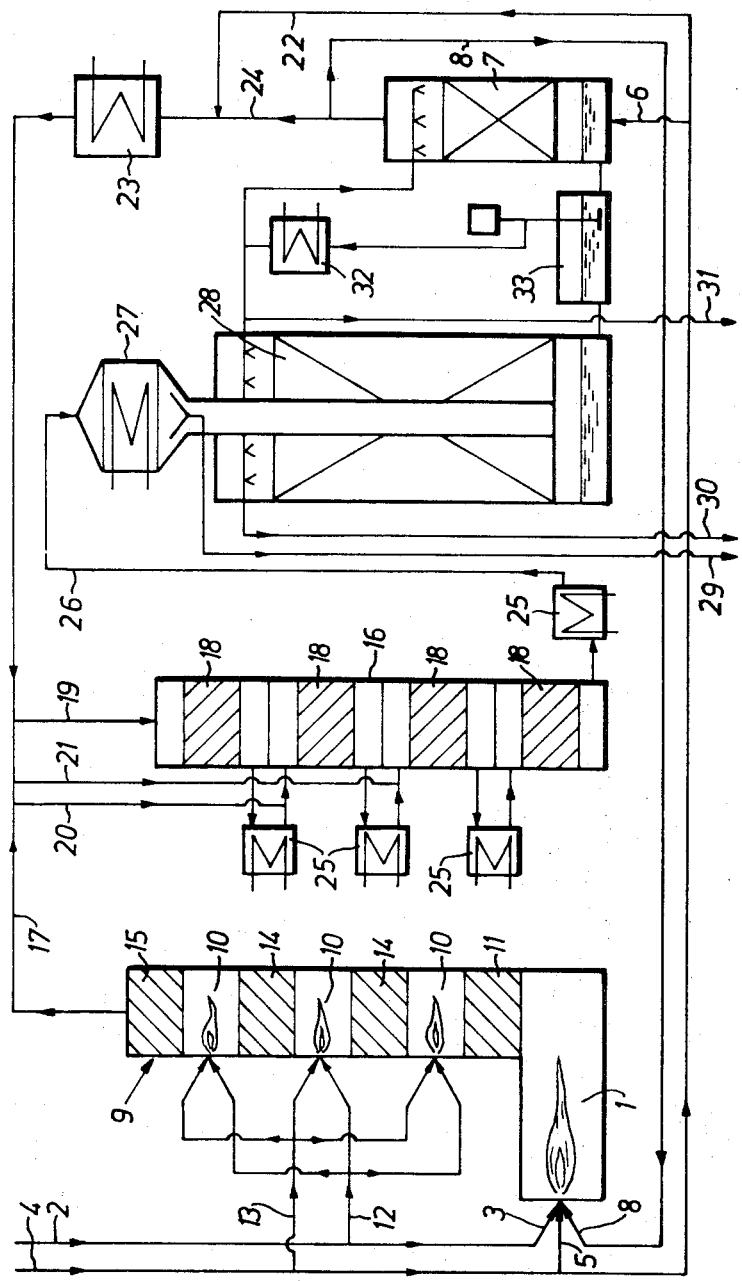

---

3,803,297
PRODUCTION OF SULFUR TRIOXIDE AND SULFURIC ACID
Hans Guth, Berg.-Neukirchen, Klaus Kleine-Weischede and Peter Reher, Leverkusen, and Hermann Wieschen, Cologne, Germany, assignors to Bayer Aktiengesellschaft, Leverkusen, Germany
Filed Nov. 16, 1972, Ser. No. 307,289
Claims priority, application Germany, Dec. 2, 1971,
P 21 59 789.7
Int. Cl. C01b 17/68
U.S. Cl. 423—533                                    8 Claims

ABSTRACT OF THE DISCLOSURE

In the method of producing sulfur trioxide and sulfuric acid from elemental sulfur, the sulfur is burned with oxygen in multiple stages with interstage cooling, the sulfur dioxide gas stream is split into several streams and feed with oxygen into a multistage catalytic convertor. A portion of the sulfur trioxide produced is recycled to the first convertor stage to control the temperature in the convertor. A second portion of the sulfur trioxide is recycled to the first stage of the burner to moderate the temperature therein. The last portion of the sulfur trioxide is cooled, part is condensed and the remainder is absorbed in sulfuric acid.

---

This invention relates to a process for the production of sulfur trioxide and sulfuric acid from sulfur, which process includes both the combustion of sulfur and the oxidation of the resulting sulfur dioxide with commercial oxygen by the contact process.

In modern plants for the production of sulfur trioxide and sulfuric acid by the contact process with known catalysts according to the reaction:

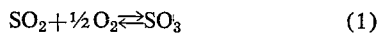

$$SO_2 + \tfrac{1}{2} O_2 \rightleftarrows SO_3 \qquad (1)$$

the sulfur dioxide is provided in the form of gases having a high sulfur dioxide content. Gases containing a high percentage of sulfur dioxide can be obtained by the combustion of elementary sulfur with air and, in particular, with commercial oxygen. However, the high temperatures which occur in the combustion of sulfur with commercial oxygen cause technical problems which have hitherto not been completely resolved.

When gases with a high sulfur dioxide content are oxidized by the contact process using several contact stages, very high temperatures occur, particularly in the first contact stage. These temperatures favor the reaction from right to left according to the above Equation 1 and irreversible damage to the catalyst layer may be caused.

In the combustion of sulfur, it is important to ensure that the sulfur is burned as completely as possible and at the same time to control the resulting temperatures. Only under these conditions can pure sulfur dioxide be produced economically.

It is known that the escape of sulfur dust or fumes from a sulfur furnace operated with compressed air can be prevented by equipping the furnace with a horizontal superheater plate which guides the flow of gas in a particular direction (German patent specification No. 1183-703). According to another known process, pulverulent sulfur is conducted into a stream of air or oxygen in such a manner that the sulfur ignites the moment it comes into contact with the oxidizing gas and undergoes immediate combustion (German patent specification No. 191596).

Other processes, again, are so conducted that the reactants are forced to flow along particular flow paths and directions (German patent specifications Nos. 262326, 367843, 376544, 711537 and 944488).

In German patent specification No. 437910 the combustion of sulfur with oxygen in the presence of an excess of sulfur vapor, optionally under excess pressure, is described. The presence of the excess sulfur during combustion is intended to have the effect of lowering the reaction temperature.

In the process described in German patent specification No. 539640, heated oxygen or air is passed in the form of fine bubbles through hot liquid sulfur.

In another known process (German patent specification No. 968066) an attempt is made to prevent residues of sulfur which are frequently left in the combustion gas after the combustion of sulfur by subdividing the air used for combustion into one primary and two secondary streams.

For processes operated at high output rates, it is important that the combustion temperature is kept at a level a which oxides of nitrogen are not formed.

German Offenlegungschrift No. 1948754 relates to a process in which the formation of oxides of nitrogen during the combustion of sulfur with oxygen-containing gases is prevented by first burning the sulfur with less than the stoichiometric quantity of oxygen and then oxidizing the resulting gaseout mixture of sulfur dioxide and sulfur with oxygen-containing gases after it has been passed through a heat exchanger.

Regarding the catalytic oxidation of gases which have a high sulfur dioxide content and the control of the high reaction temperatures which arise in the individual contact stages, it is already known that the temperature in the contact stages may be reduced by introducing cold gases. Indirect removal of heat by built-in heat exchangers is also known. These measures, however, are frequently insufficient to prevent localized overheating of the contact catalyst mass, especially if the gases brought into contact with the catalyst contain 9% or more of sulfur dioxide. Further, a process for the catalytic oxidation of sulfur dioxide to sulfur trioxide in several contact stages is known in which, in order to prevent the establishement of an equilibrium (in accordance with Equation 1), a part of the gases which are to be reacted is first preheated to at least the starting temperature of the reaction and then passed a the rate of from 0.6 to 2.0 meters per second through a preliminary contact provided before the main contact apparatus, and the gases leaving this precontact are mixed with colder gases containing sulfur dioxide in such quantities that the mixed gas contains from 20 to 30% of the original sulfur dioxide in the form of sulfur trioxide and the temperature of the mixed gas is not allowed to fall below the starting temperature required for the reaction on the main contact catalyst. The resulting gas mixture is then catalytically oxidized to sulfur trioxide in the usual manner.

In German Auslegeschrift No. 1066557 a process is described in which a partial stream of the reaction gases from one contact stage is used to heat the fresh gases to the starting temperature indirectly. In addition, these gases which have already partly undergone reaction may also be mixed with fresh gases directly. Although this procedure allows for efficient heat regulation in the contact system, it has the disadvantage that large quantities of gases must be kept in circulation because of their inert gas content.

In one application a process is described for the catalytic oxidation of sulfur dioxide to sulfur trioxide in several contact stages in which process intermediate absorption of the sulfur trioxide formed is carried out after a sulfur dioxide conversion of from about 80 to 95%. In this process, about 2 to 10 volumes percent of sulfur trioxide together with at least a partial stream of the air required for dilution are added to the sulfur dioxide-containing gases before they enter the first contact stage. The partial stream containing sulfur trioxide is produced by blowing sulfur trioxide out of oleum.

It is an object of the invention to provide a simple, highly efficient process for producing sulfur trioxide and sulfuric acid by combustion of sulfur.

These and other objects and advantages are realized in accordance with the present invention which is a process for the production of sulfur trioxide and sulfuric acid by stepwise combustion of sulfur with commercial oxygen followed by catalytic oxidation of the resulting sulfur dioxide to sulfur trioxide in several contact stages arranged in series, in which process:

(a) In a first combustion stage, from about 5 to 40 percent of the total quantity of sulfur which is to be oxidized is mixed with from about half to one times its molar amount of recycled sulfur trioxide at temperatures of from about 40° C. to 80° C. and the mixture is combusted without external cooling with up to the stoichiometric quantity of oxygen required for complete combustion of the sulfur contained therein to sulfur dioxide, the temperature at this stage being maintained at from about 1500° C. to 2000° C.;

(b) The resulting hot combustion gases are cooled to from about 800° C. to 1000° C.;

(c) The remaining 60 to 95 mole percent of sulfur to be oxidized, together with the cooled combustion gases, which may contain sulfur vapor, and together with the necessary quantity of oxygen, is then combusted stoichiometrically in a series of adjacent stages and at the same time cooled indirectly so that the temperatures in the individual stages are maintained at from about 1700° C. to 2500° C., the hot combustion gases being cooled to a temperature of about 800° C. to 1000° C. between the individual combustion stages;

(d) The minimum total quantity of oxygen required for stoichiometric oxidation of the resulting sulfur dioxide to sulfur trioxide is supplied with portions of sulfur dioxide from contact layer to contact layer in such quantities that the molar ratio of oxygen to sulfur dioxide diminishes from one contact layer to the next from a value of from about 5.5 to 1.5 before the first contact layer to a minimum value of about 0.5 after the final addition of sulfur dioxide, recycled sulfur trioxide being added to the gas before the first contact layer in an amount constituting from about 5 to 20 volume percent of the total gas reaching the first layer, so that the maximum reaction temperatures occurring in the individual contact layers are kept down from about 600 to 620° C.

It has been found that stable combustion of sulfur with commercial oxygen can be ensured even at varying rates of output if from about 5 to 40 percent of the sulfur which is to be oxidized is combusted in the first stage without cooling and the remainder is combusted in the following stages with cooling. In computing the ½ to 1 mole of sulfur trioxide recycled to the uncooled first stage per mole of sulfur supplied thereto, the molecular weight of the sulfur is asumed to be 32.

When sulfur is oxidized stoichiometrically with oxygen, the combustion temperature when the reactants are in equilibrium, taking into account dissociation processes, ($SO_2$, $SO$, $S$ and $O_2$) is found to be about 3000° C.

According to the invention, the temperature of about 3000° C. normally occurring in the combustion of sulfur with oxygen can be reduced to the permissible level, which varies with the nature of the materials used and is about 2000° C., by adopting the following measures:

1. Recycling some $SO_3$ to the first stage of combustion; and
2. Combustion of sulfur with a less than stoichiometric quantity of oxygen coupled with the return of $SO_3$ to the first stage of combustion.

The reaction proceeds according to the following equation:

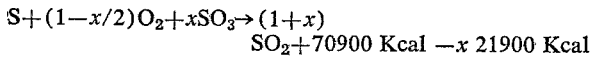
$$S + (1-x/2)O_2 + xSO_3 \rightarrow (1+x)$$
$$SO_2 + 70900 \text{ Kcal} - x\, 21900 \text{ Kcal}$$

According to the invention, only from about 5 to 40% of the total quantity of sulfur are oxidized in the first stage of combustion in the primary combustion chamber, with the addition of substances which lower the temperature. The primary combustion chamber is preferably not subdivided into substages. The hot gas leaving the primary combustion chamber is cooled to temperatures of from about 800° C. to 1000° C. and conducted into indirectly cooled combustion stages arranged in series with simultaneous addition of additional sulfur and oxygen fed in stepwise and the sulfur is oxidized with the stoichiometric quantity of oxygen. In principle, the hot gas which has left the primary combustion chamber and been cooled to temperatures of from about 800 to 1000° C. and the quantity of sulfur remaining could be oxidized stoichiometrically according to the invention in one adjacent combustion stage with indirect cooling, but for technical purposes it is preferred in accordance with the invention to carry out the subsequent combustion in from two to four adjacent combustion stages which are spatially separated from each other. The remaining 95 to 60% of the sulfur to be burned is oxidized in these cooled combustion stages in which the heat of reaction is removed by indirect cooling. This stepwise combustion with cooling is advantageously carried out in a single combustion chamber system hereinafter referred to as the secondary combustion chamber system. The maximum reaction temperature occurring in the individual stages of this combustion chamber system is about 2500° C.

The heat of reaction may be removed by indirect cooling after this combustion. The extent to which the sulfur dioxide is cooled before it is oxidized by the contact process depends on the temperature of the oxygen with which it is brought into contact. According to a preferred embodiment of this process, $SO_2/O_2$ gas mixtures enter the first contact layer at a temperature of from about 350 to 450° C.

The catalytic oxidation of sulfur dioxide to sulfur trioxide is carried out in contact with the usual catalyst on a plurality of spatially separated contact layers arranged in series. The number of contact layers used is preferably from 3 to 5. In detail, the contact process is carried out as follows: The sulfur dioxide issuing from the secondary combustion chamber system and which has been suitably cooled is added portionwise in measured amounts, varying from contact layer to contact layer, to at least the minimum total quantity of oxygen required for complete stoichiometric oxidation of the sulfur dioxide to sulfur trioxide. The quantities of sulfur dioxide added are calculated so that the molar ratios of oxygen to sulfur dioxide vary from values of from about 5.5 to 1.5 before the first contact layer to a value of about 0.5 after the last addition of $SO_2$, the amounts depending on the quantity of recycled sulfur trioxide, which is from about 5 to 20 value percent based on the total quantity of gas before the first contact layer. The amount of sulfur trioxide added thus corresponds to a preliminary conversion of from 25 to 45%, based on $SO_2 + SO_3$ supplied to this layer. These limits must be observed in order that the outlet temperatures of the gases will be regulated in accordance with the invention to a maximum temperature of about 620° C. after contact in the individual contact layers. Within the context of this process, it is particularly preferred to maintain an oxygen/sulfur dioxide molar ratio of about 2.6 with a rate of sulfur trioxide return corresponding to a preliminary conversion of about 33% and an inlet temperature of the gas mixture entering the contact stages of about 370° C. These preferred data refer to the conditions in front of the first catalyst layer. Although it would, in principle, be possible to carry out the contact process without the addition of sulfur trioxide, this would necessitate a larger number of contact stages because the sulfur dioxide would have to be subdivided into a larger number of different portions for the contact catalysts. The recycled sulfur trioxide can be easily obtained by driving sulfur trioxide out of oleum with a partial stream of oxygen. According to the process of the invention, conversion of sulfur dioxide to sulfur trioxide is achieved with conversion rates of up to about 95% if, for example, the sulfur dioxide is passed through four contacts without intermediate absorption and further addition of sulfur dioxide is carried out in each case at a rate adjusted according to the temperature of the gases leaving each contact stage. The maximum contact temperature according to the invention are restricted to from about 600 to 620° C. The heat of reaction is removed in known manner by heat exchangers arranged between the contacts and utilized e.g. for superheating steam and preheating tank feed water.

After the fourth contact layer, the sulfur trioxide formed may either be removed from the gas mixture by condensation and/or absorption in high percentage oleum or sulfuric acid according to production requirements.

The residual gas, which has a sulfur trioxide content which corresponds to the paritial pressure of sulfur trioxide at the condensation temperature or oleum run off temperature, may be further oxidized to a total conversion of over 99% in a separate contact (having two shelves with intermediate cooling of the gas). Since after condensation and/or absorption of sulfur trioxide the residual quantity of gas amounts to only about 10% of the total quantity of gas which has passed through the contact, this final separate contact may be quite small. This final residual conversion may be carried out with the addition of oxygen to improve the oxygen/sulfur dioxide ratio.

The process according to the invention will now be described in more detail with reference to the accompanying drawing which is a flow sheet of the process. In the drawing the numerals have reference to the following structures:

1—Primary combustion chamber
2—Sulfur reserve
3—Sulfur inlet
4—Oxygen supply
5—Oxygen inlet
6—Oxygen conduit (partial stream)
7—Oleum tower
8—Sulfur trioxide return conduit
9—Secondary combustion chamber system
10—Combustion stages
11—First cooling zone
12—Sulfur injection device
13—Oxygen injection device
14—Cooling zones
15—Last cooling zone
16—Contact system
17—Sulfur dioxide conduit
18—Catalyst layers
19—Sulfur dioxide feed to first contact
20—Sulfur dioxide feed to second contact
21—Sulfur dioxide feed to third contact
22—Oxygen supply to contact
23—Preheater
24—Oxygen partial stream (containing $SO_3$)
25—Heat exchanger
26—Sulfur trioxide conduit
27—Condensation
28—Absorption
29—Discharge conduit for sulfur trioxide (condensed)
30—Oleum discharge
31—Residual gas
32—Oleum cooler
33—Oleum receiver.

Referring now more particularly to the figure, the reference numeral 1 represents a brick-lined sulfur combustion furnace which is resistant to combustion temperatures of up to about 2000° C. In this furnace, the primary combustion chamber, from 5 to 40% of the total quantity of sulfur introduced at inlet 3 from pipe 2 is oxidized with not more than the stoichiometric quantity of oxygen fed in at inlet 4 from pipe 5. A partial stream of this oxygen is conducted through the inlet 6 into the oleum tower 7 to carry out sulfur trioxide which is then introduced into the primary combustion chamber through the inlet 8 to lower the combustion temperature. The combustion gas, which may be laden with sulfur vapor, leaves the hot ignition chamber to be conducted into the indirectly cooled secondary combustion chamber system 9 which is represented in the drawing as comprising three combustion stages 10 and is preferably in the form of a pipe wall vessel. In this secondary combustion chamber system, the combustion gas is first cooled to a temperature of from about 800 to 1000° C. in a first cooling zone 11. The remainder of the sulfur to be oxidized is then injected into this precooled gas in the series of combustion stages 10 from the conduits 12 and oxidized stoichiometrically with oxygen introduced by way of the conduits 13. After each combustion stage 10, the resulting combustion gases which may reach temperatures of up to 2500° C. are cooled to temperatures of from about 800° C. to 1000° C. in adjacent cooling zones 14. After their passage through the final combustion stage followed by indirect cooling in a cooling zone 15, they are cooled to a suitable temperature to enable them to be mixed with the contact oxygen and are conveyed to the contact system 16 through the conduit 17 and fed to the individual catalyst layers 18 by way of inlet pipes 19, 20 and 21. The quantity of oxygen required for complete stoichiometric oxidation is conveyed to the first catalyst layer through a conduit 22 and preheater 23. A partial stream of this oxygen is passed through the oleum tower 7, entering at 6 and leaving at 24, to carry sulfur trioxide from it, this sulfur trioxide being then mixed with the total quantity of oxygen in front of the first contact catalyst layer. The heat of reaction produced in the catalytic reaction is removed by the heat exchangers 25 situated between and behind the catalyst layers. After the fourth catalyst layer, the sulfur trioxide formed is carried to a condensation 27 and absorption 28 stage by way of the conduit 26. The resulting condensed sulfur trioxide and 65% oleum are continuously removed through pipes 29 and 30. The residual gas may be conveyed to a small final contact plant (not shown) by way of pipe 31. Reference numeral 32 indicates an oleum cooler and 33 an oleum receiver.

The quantity of sulfur trioxide introduced into the primary combustion chamber in which sulfur is being oxidized does not constitute an undue load on the course of production since only from 5 to 40% of the total quantity of sulfur are oxidized there. This recycled sulfur trioxide is preferably at a temperature of from about 40° C. to 80° C. but the temperature may also be higher or lower. At higher temperatures, the quantity of sulfur trioxide added is increased accordingly. If at the same time combustion is carried out with a subequivalent amount of oxygen, then the amount of sulfur vapor with which the combustion gas is loaded in the first cooling zone can be suitably adapted to the selected pressure stage of the steam system and hence to the selected wall temperature of the secondary combustion system so that condensation of sulfur on the indirectly cooled wall of this system can be prevented. Thus, for example, at a wall temperature of 250° C., the maximum amount of sulfur with which the gas may be laden without condensation taking place is 180 g. of S/Nm.$^3$, whereas if the wall temperature is 280° C. the maximum permissible sulfur load is 450 g. of S/Nm.$^3$. The reduction in temperature which occurs in the primary combustion chamber when combustion is carried out with a sub-equivalent amount of oxygen is due to the heat-required for evaporation and disproportionation to convert the liquid $S_8$ molecules introduced into the chamber into gaseous $S_2$ molecules.

In the cooled secondary combustion chamber system, stoichiometric quantities of sulfur and oxygen are introduced in graded amounts into the various combustion stages arranged in series so that the flow of heat in the different combustion stages never exceeds $q=10^6$ Kcal./m.$^2$h.

The rate of evaporation in the tubular reaction vessel is therefore in the region of intensive evaporation with bubble formation so that reaction tubes of conventional construction can be used. The heat of reaction is discharged to a cooling medium. A suitable cooling medium is steam; the heat exchanger surfaces function as evaporators so long as uncombusted sulfur vapor is still present, as in the first cooling zone. If desired, superheating surfaces may be provided to cool the sulfur dioxide after complete combustion of the sulfur. To remove excessive amounts of heat with a high rate of heat transfer per unit surface, the principle of "evaporation in supercooled liquids (evaporation cooling)" may be employed, in which case even greater quantities of heat can be tolerated in the combustion chamber. Owing to the high rate of heat transfer per unit area and the small volume of gas, reaction vessels with much smaller surface areas may be used than those required for the combustion of sulfur with air.

The control of the reaction temperatures in the combustion of sulfur to from about 1700° C. to 2500° C. in accordance with the invention on the one hand ensures complete combustion of sulfur with stoichiometric quantities of oxygen without any risk of leakage of sulfur vapors and on the other hand enables conventional materials to be used for the combustion chambers.

Other very important advantages are the absence of nitrogen as a gas and energy ballast and the absence of oxides of nitrogen as impurities in the sulfur dioxide.

The quantities of gas produced when combustion is carried out by the process described here, even with maximum recycling of sulfur trioxide, are only about one third of the quantities produced by the stoichiometric combustion of sulfur with air. The quantities of gas to be contacted are therefore much smaller.

The process according to the invention for the production of sulfur trioxide and oleum can easily be combined with a process for the production of liquid sulfur dioxide. In that case, after combustion of sulfur in the secondary combustion chamber system and cooling to about 400° C., a part of the hot sulfur dioxide may be cooled stepwise to the condensation temperature of −12° C. (in the absence of inert gas) if no excess pressure is employed. Cooling may be carried out in known manner by using the heat to heat tank feed water, by cooling with air and water or by means of freezing mixtures.

The process according to the invention will now be described in more detail with reference to the following example.

EXAMPLE

The process according to the invention is described below with reference to a plant used for producing (a) 40 tons per day of 100% $SO_3$;
(b) 130 tons per day of $SO_3$ as 65% oleum; and
(c) 130 tons per day of $SO_3$ as liquid $SO_2$.

An atomization burner arranged at the end face of a horizontal brick-lined sulfur combustion furnace is fed with 1375 kg. per hour of elementary sulfur (25% of the total quantity) in liquid form together with 385 Nm.$^3$/h of oxygen and 770 Nm.$^3$/h. of recycled sulfur trioxide. The combustion product comprises 1540 Nm.$^3$/h. of $SO_2$ and 195 Nm.$^3$/h. of excess sulfur vapor.

The excess sulfur vapor corresponds to a charge of 180 g. S/Nm.$^3$ $SO_2$. Before its entry into the sulfur combustion furnace, the stream of oxygen which flows at the rate of 385 Nm.$^3$/h. absorbs 770 Nm.$^3$ of $SO_3$/h. in its passage through a tower through which 657 oleum is trickled at a temperature of 52° C. The oxygen which is available for the combustion of sulfur in the primary combustion chamber at the rate of 770 Nm.$^3$/h. is made up half of the oxygen which has passed through the oleum tower and half of the oxygen derived from the decomposition of the recycled sulfur trioxide into sulfur dioxide and oxygen.

The combustion temperature is established at about 1800° C. as a result of the energy consuming reaction of sulfur trioxide decomposition and the evaporation and disproportionation of sulfur which is present in stoichiometric excess.

The gas which leaves the sulfur combustion furnace at a temperature of about 1800° C. is conducted into a waste heat boiler directly flange connected. This waste heat boiler is in the form of a pipe wall construction (pipe welded for gas-tight piping) and attached to a 30 atmospheres steam system, the pipe wall being arranged to serve as evaporator surface.

The gas from the sulfur combustion furnace is cooled from about 1800° C. to about 1000° C. in the first cooling zone of the pipe wall vessel before sulfur and oxygen are fed into the adjacent combustion stage where they undergo stoichiometric combustion.

The quantity of sulfur remaining to be burned beyond the combustion of sulfur in the uncooled primary combustion chamber, which remainder amounts to 75% (4125 kg./h.) of the total quantity put into the process, is stoichiomertically oxidized with oxygen in three stages of the cooled secondary combustion chamber system. Sulfur and oxygen are fed into the different stages at the following rates: 1st feed: 1375 kg./h. sulfur; and 1159 Nm.$^3$/h. of oxygen.

The above quantity of oxygen includes the oxygen required for stoichiometric burning of the sulfur vapor excess from the primary combustion chamber. 2nd feed: 1375 kg./h. of sulfur; and 963 Nm.$^3$/h. of oxygen. 3rd feed: 1375 kg./h. of sulfur; and 963 Nm.$^3$/h. of oxygen.

The sulfur and oxygen are introduced by means of cooled atomization burners which are installed in the axis of the pipe wall vessel and connected with the cooling system of the pipe wall.

Between the feed points are cooling zones in which the gas is cooled to about 1000° C. After the final combustion stage, the $SO_2$ gas is cooled to about 400° C., the heat removed being used to superheat steam. This heat is removed to a steam system operating at 30 atmospheres.

After gas has been tapped off for the production of liquid $SO_2$, 3110 Nm.$^3$ of $SO_2$/h. remain for reaction by the contact process in a contact apparatus comprising four shelves. The amount of sulfur dioxide supplied to the different catalyst layers is as follows:

600 Nm.$^3$/h. to the 1st shelf,
1000 Nm.$^3$/h. to the 2nd shelf,
1510 Nm.$^3$/h. to the 3rd shelf.

The total oxygen stream of 1555 Nm.$^3$/h. is carried to the first shelf by way of the steam heated preheater, and a partial stream of 150 Nm.$^3$/h. of oxygen carries 300

$Nm.^3/h.$ of $SO_3$ from the 65% oleum in the oleum trickling tower, the composition thereby corresponding to a preliminary conversion of 33.3% before the gases reach the first shelf.

Quantities and conditions before and after the catalyst shelves:

1st shelf
Inflow:
600 $Nm.^3/h.$ of $SO_2$
300 $Nm.^3/h.$ of $SO_3$
1555 $Nm.^3/h.$ of $O_2$
33.3% preliminary conversion
370° C. temperature
2.58 $O_2/SO_2$ ratio.

Outflow:
135 $Nm.^3/h.$ of $SO_2$
765 $Nm.^3/h.$ of $SO_3$
1317.5 $Nm.^3/h.$ of $O_2$
85% conversion
620° C. temperature.

2nd shelf
Inflow:
1135 $Nm.^3/h.$ of $SO_2$
765 $Nm.^3/h.$ of $SO_3$
1317.5 $Nm.^3/h.$ of $O_2$
40.2% preliminary conversion
370° C. temperature
1.16 $O_2/SO_2$ ratio.

Outflow:
340 $Nm.^3/h.$ of $SO_2$
1560 $Nm.^3/h.$ of $SO_3$
925 $Nm.^3/h.$ of $O_2$
82% conversion
620° C. temperature.

3rd shelf
Inflow:
1850 $Nm.^3/h.$ of $SO_2$
1560 $Nm.^3/h.$ of $SO_3$
925 $Nm.^3/h.$ of $O_2$
45.7% preliminary conversion
410° C. temperature.
0.5 $O_2/SO_2$ ratio Outflow:
785 $Nm.^3/h.$ of $SO_2$
2625 $Nm.^3/h.$ of $SO_3$
392.5 $Nm.^3/h.$ of $O_2$
77% conversion
598° C. temperature.

4th shelf
Inflow:
Outflow from 3rd shelf at 420° C.
Outflow:
190 $Nm.^3/h.$ of $SO_2$
3220 $Nm.^3/h.$ of $SO_3$
95 $Nm.^3/h.$ of $O_2$
94.5% conversion
468° C. temperature.

The inlet temperatures before the shelves are regulated by steam cooling or superheating.

465 $Nm.^3$ of $SO_3/h.$ are removed by condensation from the 3220 $Nm.^3$ $SO_3/h.$ in the gas mixture leaving the fourth shelf for the production of liquid $SO_3$ mentioned above. The cooling of the gas to 42° C. necessary for this purpose is effected by water cooling and by using the heat to preheat tank feed water.

Of the 2755 $Nm.^3$ of $SO_3/h.$ introduced into an oleum tower for the production of 65% oleum and for recycling to the sulfur furnace and to the front of the first catalyst shelf, 2588 $Nm.^3/h.$ are absorbed in the tower. The corresponding run off temperature of the oleum is 40° C.

The residual gas leaving the oleum tower has the following composition:

$SO_3$: 167 $Nm.^3/h. \cong 37.0$ vol. percent
$SO_2$: 190 $Nm.^3/h. \cong 42.0$ vol. percent
$O_2$: 21 $Nm.^3/h. \cong 21.0$ vol. percent To achieve more than 99.5% conversion of $SO_2$, it is necessary to provide an additional small two-shelf contact apparatus with intermediate cooling of the gases.

It will be appreciated that the instant specification and examples are set forth by way of illustration and not limitation and that various modifications and changes may be made without departing from the spirit and scope of the present invention.

What is claimed is:

1. In the production of sulfur trioxide by stepwise combustion of sulfur with oxygen followed by catalytic oxidation of the resulting sulfur dioxide to sulfur trioxide in several contact stages arranged in series, the improvement which comprises:
    (a) in a first stage oxidizing from about 5 to 40 percent of the total quantity of sulfur which is to undergo combustion with not more than the stoichiometric quantity of oxygen required for its complete combustion, with the addition of from about half to one times as many moles of recycled sulfur trioxide as of sulfur at a temperature of from about 40° C. to 80° C., this reaction being carried out without external cooling and the temperature at this stage being maintained at from about 1500° C. to 2000° C.;
    (b) cooling the resulting hot combustion gases to a temperature of from about 800° C. to 1000° C.;
    (c) stoichiometrically combusting the remaining quantity of sulfur, together with the cooled combustion gases and with the necessary quantity of oxygen with indirect cooling in adjacent stages arranged in series in which the temperature is maintained at from about 1700° C. to 2500° C. in the individual stages and cooling the hot combustion gases to a temperature of from about 800° C. to 1000° C. between the individual combustion stages;
    (d) passing the sulfur dioxide-containing combustion product from the last combustion stage together with the total quantity of oxygen required at least for stoichiometric oxidation of the sulfur dioxide to sulfur trioxide to said contact stages at rates which differ from one contact stage to the next so that the molar ratio of oxygen to sulfur dioxide diminishes from contact stage to contact stage from a value of about 5.5 to 1.5 before the first contact stage down to a minimum value of about 0.5 after the final addition of sulfur dioxide, sulfur trioxide being recycled to the gas forwarded to the first catalyst stage in an amount constituting about 5 to 20 volume percent of the gas reaching the first stage so that the maximum reaction temperatures occurring in the individual contact stages are kept down to from about 600 to 620° C.

2. The process of claim 1, wherein the further combustion of sulfur of step (c) is effected in from two to four stages.

3. The process of claim 1 in which the sulfur and oxygen are introduced into the individual indirectly cooled combustion stages of step (c) at such rates that the flow of heat does not exceed $q = 10^6$ kcal./m.$^2$ h.

4. The process of claim 1, wherein the amount of oxygen supplied in step (a) is less than the stoichiometric quantity so that some uncombusted sulfur vapor is mixed with the combustion product gases of step (a).

5. The process of claim 4, in which the maximum load of sulfur vapor at the inlet into the indirectly cooled stages of step (c) is selected according to the pipe wall temperature of the cooled stages so as to avoid condensation of sulfur on said pipe wall.

6. The process of claim 4, in which the maximum load of sulfur vapor at the inlet into the indirectly cooled stages of step (c) ranges from about 180 g. of $S/Nm.^3$ when the pipe wall temperature is 250° C. up to about 450 g. of $S/Nm.^3$ when the pipe wall temperature is 280° C.

7. The process of claim 1, in which the molar ratio of oxygen to sulfur dioxide in the gas which is to be contacted in step (d) is about 2.6 before the first contact stage.

8. The process of claim 1, including the further step of absorbing at least some of the sulfur trioxide from step (d) in sulfuric acid to produce oleum, and passing at least some of the oxygen to be used in steps (a) and (d) through said oleum to remove some sulfur trioxide from said oleum for use in steps (a) and (d).

References Cited
UNITED STATES PATENTS

| | | | |
|---|---|---|---|
| 1,566,538 | 12/1925 | Howard | 23—278 |
| 996,215 | 6/1911 | Contamin | 23—278 |
| 1,863,705 | 6/1932 | Weinberg | 423—543 |
| 3,404,955 | 10/1968 | Dechsel et al. | 423—522 |
| 3,404,956 | 10/1968 | Dechsel et al. | 423—522 |

FOREIGN PATENTS

| | | | |
|---|---|---|---|
| 497,646 | 11/1953 | Canada | 423—543 |

OSCAR R. VERTIZ, Primary Examiner
C. P. STRAUB, Assistant Examiner

U.S. Cl. X.R.
423—543, 532, 522; 23—278, 261